(12) United States Patent
Horikoshi et al.

(10) Patent No.: US 11,754,029 B2
(45) Date of Patent: Sep. 12, 2023

(54) RECOIL STARTER

(71) Applicant: STARTING INDUSTRIAL CO., LTD., Tokyo (JP)

(72) Inventors: Yoshinori Horikoshi, Tokyo (JP); Shigemitsu Chigira, Tokyo (JP); Hideki Hashiba, Tokyo (JP)

(73) Assignee: STARTING INDUSTRIAL CO., LTD., Tokyo (JP)

(*) Notice: Subject to any disclaimer, the term of this patent is extended or adjusted under 35 U.S.C. 154(b) by 0 days.

(21) Appl. No.: 17/639,067

(22) PCT Filed: Sep. 4, 2020

(86) PCT No.: PCT/JP2020/033664
§ 371 (c)(1),
(2) Date: Feb. 28, 2022

(87) PCT Pub. No.: WO2021/054155
PCT Pub. Date: Mar. 25, 2021

(65) Prior Publication Data
US 2022/0299000 A1    Sep. 22, 2022

(30) Foreign Application Priority Data
Sep. 19, 2019  (JP) ................ 2019-170250

(51) Int. Cl.
*F02N 3/02*  (2006.01)
*F16C 11/04*  (2006.01)
*F02N 5/02*  (2006.01)

(52) U.S. Cl.
CPC .............. *F02N 3/02* (2013.01); *F02N 5/02* (2013.01); *F16C 11/04* (2013.01)

(58) Field of Classification Search
CPC .................................. F02N 3/02; F02N 5/02
(Continued)

(56) References Cited

U.S. PATENT DOCUMENTS 887,067 A * 5/1908 Coleman ............... F02N 5/02
123/185.14
1,217,762 A * 2/1917 Herzmark ............. F02N 3/02
123/185.3

(Continued)

FOREIGN PATENT DOCUMENTS

CN       1763363 A    4/2006
CN     101769220 A    7/2010
(Continued)

OTHER PUBLICATIONS

Machine translation of JPH08303331A (Year: 1995).*
(Continued)

*Primary Examiner* — Phutthiwat Wongwian
*Assistant Examiner* — Arnold Castro
(74) *Attorney, Agent, or Firm* — Procopio, Cory, Hargreaves & Savitch LLP

(57) ABSTRACT

A recoil starter includes: a starter case provided with a reel support shaft; and a ratchet guide rotatably attached to the reel support shaft in a state in which a frictional resistance is applied. The ratchet guide includes: a through hole into which the reel support shaft is insertable; and a locking portion configured to be engaged with the reel support shaft on an inner periphery of the through hole. A movement of the ratchet guide in an axial direction of the reel support shaft is restricted in a state in which the locking portion is engaged with the reel support shaft.

10 Claims, 10 Drawing Sheets

(58) Field of Classification Search
USPC ............... 123/185.2, 185.14, 185.3, 185.4
See application file for complete search history.

(56) References Cited

U.S. PATENT DOCUMENTS

| | | | | |
|---|---|---|---|---|
| 2,460,420 A * | 2/1949 | Kincannon | ............... | F02N 3/02 123/185.3 |
| 2,500,076 A * | 3/1950 | Honeyman | ............... | F02N 3/02 123/185.3 |
| 3,733,504 A * | 5/1973 | Dennis | ............... | H02K 5/1732 310/90 |
| 3,782,355 A * | 1/1974 | Hamman | ............... | F02N 3/02 123/185.2 |
| 4,370,954 A * | 2/1983 | Asao | ............... | F02N 3/02 123/185.3 |
| 4,480,605 A * | 11/1984 | Bloemers | ............... | F02N 3/02 192/36 |
| 4,492,190 A * | 1/1985 | Greenwood | ............... | F02N 3/02 123/185.2 |
| 4,582,030 A * | 4/1986 | Reese | ............... | F02B 63/02 74/577 SF |
| 4,641,614 A | 2/1987 | Krebs | | |
| 4,651,688 A * | 3/1987 | Selzer | ............... | F02B 75/34 123/185.14 |
| 4,850,233 A * | 7/1989 | Ishigo | ............... | F02N 3/02 123/185.2 |
| 5,063,812 A * | 11/1991 | Mercier | ............... | F02N 3/02 74/577 M |
| 5,067,451 A * | 11/1991 | Tyler | ............... | F02N 3/02 267/156 |
| 5,163,392 A * | 11/1992 | Morishima | ............... | F02N 5/02 123/185.14 |
| 5,287,832 A * | 2/1994 | Uhl | ............... | F02N 3/02 123/185.3 |
| 5,564,378 A * | 10/1996 | Rodriguez | ............... | F02N 3/02 123/185.3 |
| 5,779,579 A * | 7/1998 | Miyagi | ............... | F16H 55/36 474/72 |
| 5,862,787 A * | 1/1999 | Unuma | ............... | F02N 3/02 123/185.3 |
| 6,178,931 B1 * | 1/2001 | Durr | ............... | F02N 3/02 123/185.3 |
| 6,263,852 B1 * | 7/2001 | Gracyalny | ............... | F02N 15/022 123/185.14 |
| 6,325,036 B1 * | 12/2001 | Gracyalny | ............... | F02N 15/027 123/185.14 |
| 6,508,220 B1 * | 1/2003 | Akaike | ............... | F02N 5/02 123/185.3 |
| 6,570,283 B2 * | 5/2003 | Niimi | ............... | H02K 5/10 310/43 |
| 6,588,390 B2 * | 7/2003 | Kawasaki | ............... | F02N 3/02 123/185.3 |
| 6,679,217 B2 * | 1/2004 | Nieda | ............... | F02N 5/02 123/185.3 |
| 6,694,941 B2 * | 2/2004 | Ueda | ............... | F02N 3/02 123/185.3 |
| 6,718,931 B2 * | 4/2004 | Morishige | ............... | F02N 3/02 123/195 P |
| 6,739,303 B2 * | 5/2004 | Harada | ............... | F02N 3/02 123/185.3 |
| 6,755,170 B2 * | 6/2004 | Morishige | ............... | F02N 3/02 123/185.3 |
| 6,776,133 B2 * | 8/2004 | Tezuka | ............... | F02N 3/02 123/185.3 |
| 6,782,863 B2 * | 8/2004 | Leasure | ............... | F16F 1/10 123/185.3 |
| 6,827,055 B2 * | 12/2004 | Tsunoda | ............... | F02N 3/02 123/185.3 |
| 6,834,633 B2 * | 12/2004 | Sing | ............... | F02N 3/02 123/185.3 |
| 6,901,899 B2 * | 6/2005 | Tsunoda | ............... | F02N 3/02 123/185.3 |
| 6,901,901 B2 * | 6/2005 | Nieda | ............... | F02N 3/02 123/185.3 |
| 6,959,680 B2 * | 11/2005 | Hashiba | ............... | F02N 3/02 123/185.3 |
| 6,959,681 B2 * | 11/2005 | Saito | ............... | F02N 3/02 123/185.3 |
| 6,971,359 B2 * | 12/2005 | Tohyama | ............... | F02N 3/02 123/185.3 |
| 6,981,482 B2 * | 1/2006 | Tsunoda | ............... | F02N 3/02 123/185.3 |
| 7,004,139 B2 * | 2/2006 | Saito | ............... | F02N 1/005 123/185.3 |
| 7,028,658 B2 * | 4/2006 | Kruse | ............... | F02N 3/02 123/185.3 |
| 7,069,896 B2 * | 7/2006 | Tsunoda | ............... | F02N 3/02 123/185.3 |
| 7,093,577 B2 * | 8/2006 | Tohyama | ............... | F16F 1/06 267/155 |
| 7,174,874 B2 * | 2/2007 | Horikoshi | ............... | F02N 3/02 123/185.3 |
| 2001/0045784 A1 * | 11/2001 | Niimi | ............... | H02K 5/10 310/90 |
| 2001/0047786 A1 * | 12/2001 | Kawasaki | ............... | F02N 3/02 123/185.3 |
| 2002/0121257 A1 * | 9/2002 | Morishige | ............... | F02N 3/02 123/185.3 |
| 2002/0121258 A1 * | 9/2002 | Nieda | ............... | F02N 3/02 123/185.3 |
| 2002/0139341 A1 * | 10/2002 | Tsuno | ............... | F02N 11/12 123/185.3 |
| 2002/0157632 A1 * | 10/2002 | Nemoto | ............... | F02N 3/02 123/185.14 |
| 2002/0174848 A1 * | 11/2002 | Nieda | ............... | F02N 3/02 123/185.14 |
| 2003/0015162 A1 * | 1/2003 | Harada | ............... | F02N 3/02 123/185.14 |
| 2003/0037750 A1 * | 2/2003 | Ueda | ............... | F02N 3/02 123/185.14 |
| 2003/0094154 A1 * | 5/2003 | Morishige | ............... | F02N 3/02 123/185.3 |
| 2003/0213455 A1 * | 11/2003 | Tohyama | ............... | F02N 3/02 123/185.3 |
| 2004/0016311 A1 * | 1/2004 | Hashiba | ............... | A01D 34/6818 123/185.3 |
| 2004/0065289 A1 * | 4/2004 | Leasure | ............... | F16F 15/1213 123/185.3 |
| 2004/0079313 A1 * | 4/2004 | Tsunoda | ............... | F02N 15/027 123/185.3 |
| 2004/0123827 A1 * | 7/2004 | Tsunoda | ............... | F02N 5/02 123/185.3 |
| 2004/0123828 A1 * | 7/2004 | Sing | ............... | F16F 15/1213 123/185.3 |
| 2004/0149249 A1 * | 8/2004 | Kruse | ............... | F02N 3/02 123/185.3 |
| 2004/0168668 A1 * | 9/2004 | Tsunoda | ............... | F02N 3/02 123/185.3 |
| 2004/0177823 A1 * | 9/2004 | Saito | ............... | F02N 3/02 123/185.3 |
| 2004/0250786 A1 * | 12/2004 | Kruse | ............... | F02N 3/02 123/185.3 |
| 2004/0250787 A1 * | 12/2004 | Tohyama | ............... | F16F 1/06 123/185.3 |
| 2005/0051127 A1 * | 3/2005 | Adam | ............... | F02N 15/023 123/185.3 |
| 2005/0056248 A1 * | 3/2005 | Nieda | ............... | F02N 3/02 123/185.3 |
| 2005/0199211 A1 * | 9/2005 | Saito | ............... | F02N 1/00 123/185.3 |
| 2005/0199212 A1 * | 9/2005 | Saito | ............... | F02N 1/005 123/185.3 |
| 2005/0252477 A1 * | 11/2005 | Schriever | ............... | F02N 5/02 123/185.14 |
| 2005/0279309 A1 * | 12/2005 | Hashiba | ............... | F02N 3/02 123/185.3 |
| 2006/0027201 A1 * | 2/2006 | Ono | ............... | F02N 15/006 123/185.14 |

(56) References Cited

U.S. PATENT DOCUMENTS

| | | | |
|---|---|---|---|
| 2006/0070596 A1* | 4/2006 | Horikoshi | F02N 3/02 123/185.3 |
| 2006/0081209 A1 | 4/2006 | Hashiba | |
| 2008/0072864 A1* | 3/2008 | Fujita | F02N 3/02 123/185.3 |
| 2008/0196685 A1 | 8/2008 | Fattorusso et al. | |
| 2010/0162985 A1 | 7/2010 | Hashiba et al. | |
| 2013/0104834 A1* | 5/2013 | Evans | F02N 3/02 123/185.3 |
| 2013/0247860 A1* | 9/2013 | Nishimura | F02N 3/02 123/185.3 |
| 2016/0138546 A1 | 5/2016 | Fujita et al. | |

FOREIGN PATENT DOCUMENTS

| | | |
|---|---|---|
| JP | UM-S61-125672 A | 7/1986 |
| JP | H05-079825 B2 | 11/1993 |
| JP | H08-284783 A | 10/1996 |
| JP | H08-303331 A | 11/1996 |
| JP | 5111147 B2 | 10/2012 |
| JP | 2016-098677 A | 5/2016 |

OTHER PUBLICATIONS

Patent Cooperation Treaty, Written Opinion, Application No. PCT/JP2020/033664, dated Oct. 20, 2020, in 4 pages.
Patent Cooperation Treaty, International Search Report, Application No. PCT/JP2020/033664, dated Oct. 20, 2020, in 6 pages.

* cited by examiner

RECOIL STARTER

CROSS-REFERENCE TO RELATED APPLICATIONS

This application is US National Stage of International Patent Application PCT/JP2020/033664, filed Sep. 4, 2020, which claims benefit of priority from Japanese Patent Application JP2019-170250, filed Sep. 19, 2019, the contents of both of which are incorporated herein by reference.

TECHNICAL FIELD

The present disclosure relates to a recoil starter in which a rope reel is rotated by pulling a recoil rope, and the rotation of the rope reel is transmitted to a crankshaft of an engine via a ratchet mechanism to start the engine.

BACKGROUND ART

In a recoil starter having a ratchet mechanism, when a reel is rotated in an engine starting direction by pulling a recoil rope, a ratchet member is rotated in an outer peripheral direction to be engaged with a drive pulley, and the rotation of the reel is transmitted to an engine side. In addition, when the recoil rope is released, the reel rotates in a direction opposite to the engine starting direction due to a restoring force of a recoil spiral spring or the like, but at this time, the ratchet member rotates in an inner peripheral direction and engages and disengages from the drive pulley. Accordingly, after the engine is started, a rotation of the engine side is not transmitted to a reel side.

As a structure for rotating the ratchet member in the outer peripheral direction when the reel rotates in the engine starting direction, for example, as disclosed in JP2016-098677A, there has been known a structure in which a ratchet guide that engages with the ratchet member is provided. Since the ratchet guide is attached in a state in which a predetermined frictional resistance is applied by a spring, the ratchet guide is configured not to rotate integrally with the reel when the reel starts to rotate in the engine starting direction. Due to such an action, when the ratchet guide and the reel rotate relatively to each other, the ratchet member attached to the reel engages with the ratchet guide and is pushed out in the outer peripheral direction.

However, in the above-described configuration of the related art, an industrial fastener (a screw, a nut, a snap ring, a push nut, or the like) for rotatably attaching the ratchet guide is necessary, and a spring for applying a frictional resistance to the ratchet guide is also necessary. For this reason, there is a problem that the number of components increases and the number of assembly steps becomes complicated.

SUMMARY OF INVENTION

The present disclosure provides a recoil starter capable of reducing the number of components and the number of assembly steps as compared with the related art.

According to an aspect of the present disclosure, a recoil starter includes: a starter case provided with a reel support shaft; a reel rotatably attached to the reel support shaft; a ratchet member swingably attached to the reel; and a ratchet guide rotatably attached to the reel support shaft in a state in which a frictional resistance is applied, and configured to engage with the ratchet member to guide a swing of the ratchet member when the reel rotates in a predetermined direction. The ratchet guide includes: a through hole into which the reel support shaft is insertable; and a locking portion configured to be engaged with the reel support shaft on an inner periphery of the through hole. A movement of the ratchet guide in an axial direction of the reel support shaft is restricted in a state in which the locking portion is engaged with the reel support shaft.

According to the aspect of the present disclosure, the ratchet guide includes the locking portion that engages with the reel support shaft around the through hole into which the reel support shaft is insertable, and is configured such that a movement of the ratchet guide in the axial direction of the reel support shaft is restricted by the locking portion engaging with the reel support shaft. According to such a configuration, since an industrial fastener for rotatably attaching the ratchet guide is unnecessary, it is possible to reduce the number of components and the number of assembly steps as compared with the related art.

According to another aspect of the present disclosure, a friction generated between the locking portion and the reel support shaft may apply the frictional resistance to the ratchet guide. According to such a configuration, since a spring for applying a frictional resistance to the ratchet guide is not necessary, it is possible to reduce the number of components and the number of assembly steps as compared with the related art.

According to another aspect of the present disclosure, a peripheral groove configured to engage with the locking portion may be provided on a surface of the reel support shaft, the locking portion may include a tubular portion into which the reel support shaft is insertable, and a locking claw configured to elastically engage with the peripheral groove may be provided on an inner peripheral surface of the tubular portion. According to such a configuration, since the ratchet guide is attached only by inserting the reel support shaft into the tubular portion, an assembling property is good.

According to another aspect of the present disclosure, the tubular portion may be divided by a plurality of slits in a peripheral direction of the tubular portion, and each of divided portions of the tubular portion may include the locking claw. According to such a configuration, by dividing a contact surface of the tubular portion that comes into contact with the outer peripheral surface of the reel support shaft, the respective divided portions are independently engaged with the outer peripheral surface of the reel support shaft, and therefore adhesion to the reel support shaft is improved as compared with a case where the tubular portion is not divided. By improving the adhesion to the reel support shaft, the frictional resistance acting on the ratchet guide can be increased, and the ratchet guide can be prevented from falling off.

According to another aspect of the present disclosure, the locking portion may be formed such that a retaining ring is attachable on an outer periphery thereof, and the locking portion may have a fall-off prevention shape configured to prevent the retaining ring from falling off. According to such a configuration, since the tubular portion can be pressed inward by attaching the retaining ring, the frictional resistance acting between the locking portion and the reel support shaft can be increased.

DESCRIPTION OF EMBODIMENTS

Embodiments according to the present disclosure will be described with reference to the drawings.

Figure 1:
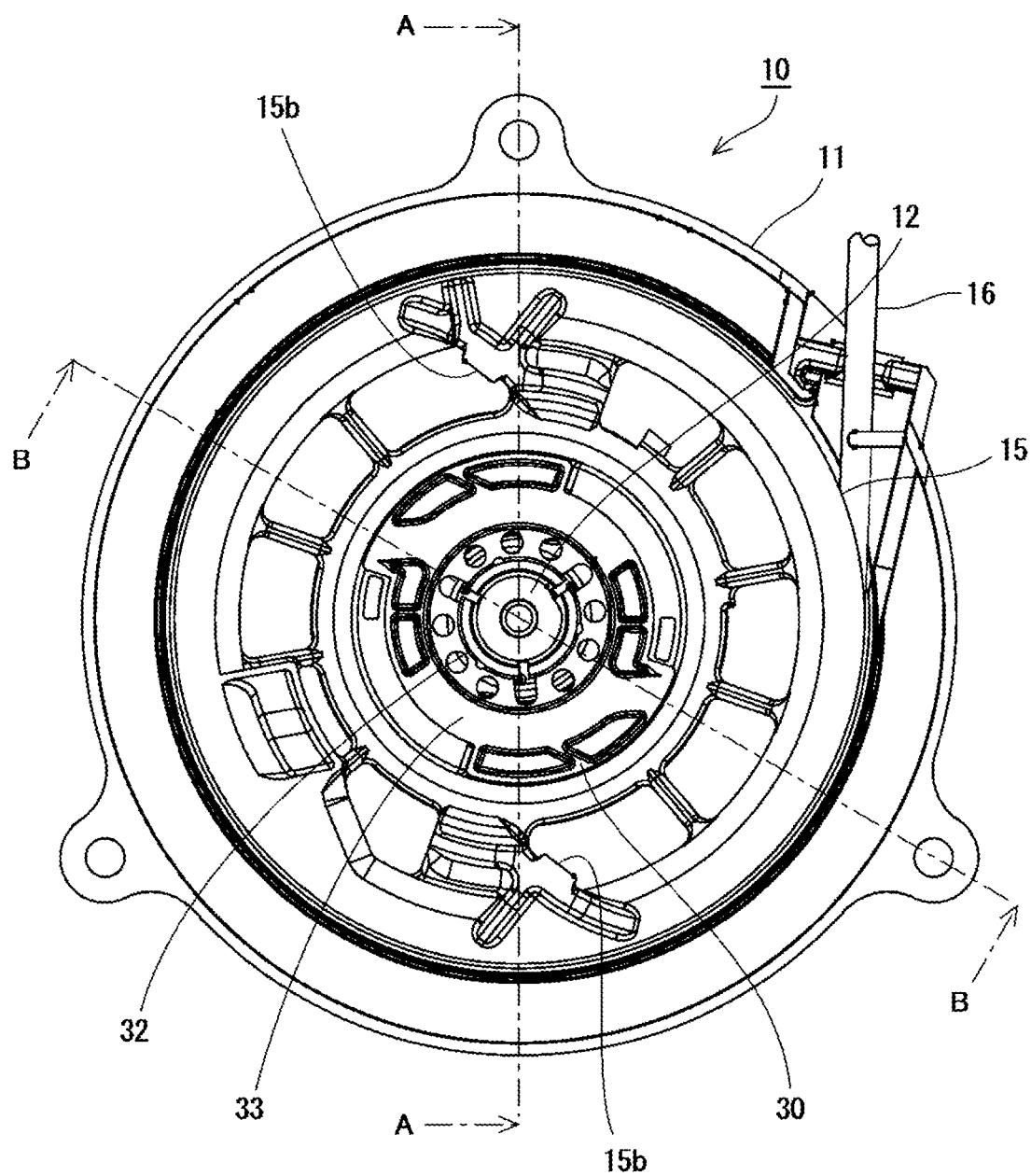
FIG. 1 is a front view of a recoil starter.
Figure 2:
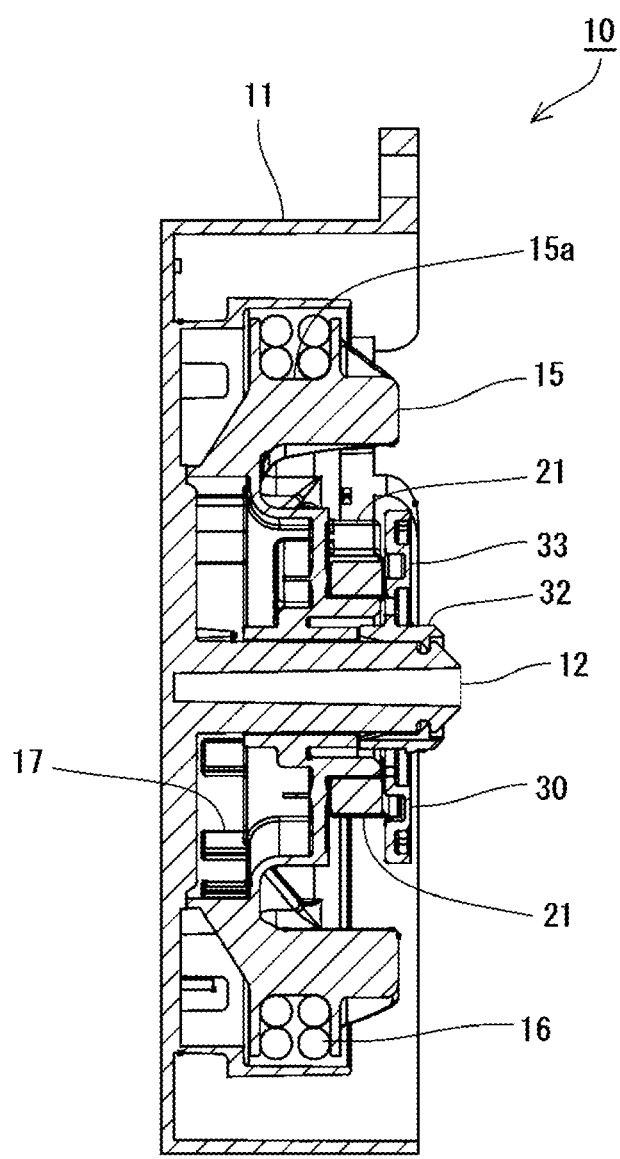
FIG. 2 is a sectional view of the recoil starter taken along a line A-A.
Figure 3:
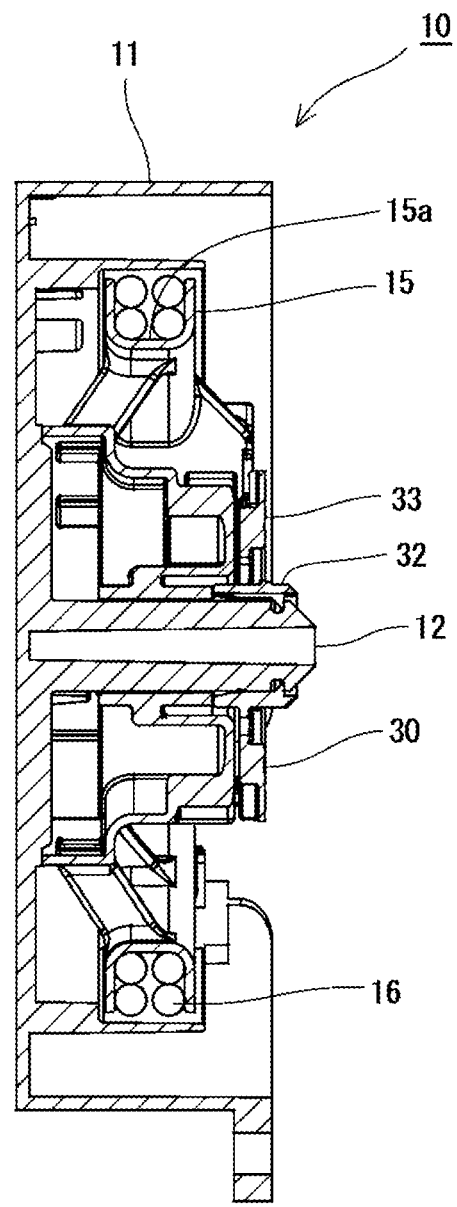
FIG. 3 is a sectional view of the recoil starter taken along a line B-B.

A recoil starter 10 according to the present embodiment is configured to apply a rotational force to a crankshaft of an engine when the engine is started, and as shown in FIGS. 1 to 3, the recoil starter 10 includes a starter case 11, a reel 15, a recoil spiral spring 17, ratchet members 21, and a ratchet guide 30.

As shown in FIGS. 2 and 3, the starter case 11 is disposed so as to cover a side surface portion of the engine while accommodating main components of the recoil starter 10. A reel support shaft 12 protruding inward so as to face the crankshaft of the engine (not shown) is formed at a center of the starter case 11. The reel 15 and the ratchet guide 30, which will be described later, are rotatably attached to the reel support shaft 12. In addition, a peripheral groove 12a for engaging with a locking portion 32 of the ratchet guide 30, which will be described later, is formed on an outer peripheral surface in a vicinity of a distal end of the reel support shaft 12.

The reel 15 is a wheel-shaped member, and includes a rope holding groove 15a configured to wind a rope 16 around the reel 15. The reel 15 is rotatably attached to the reel support shaft 12 by passing the reel support shaft 12 through a hole formed in a central portion of the reel 15. One end of the rope 16 wound around the reel 15 is fixed to the rope holding groove 15a of the reel 15, and the other end of the rope 16 is drawn out to the outside of the starter case 11. Therefore, the reel 15 is configured to rotate about the reel support shaft 12 when an operator vigorously pulls the drawn out rope 16.

The ratchet member 21, which will be described later, is swingably attached to the reel 15, and ratchet receiving portions 15b that engage with tip ends of the ratchet member 21 when the ratchet member 21 swings are formed at the reel 15. As will be described in detail later, when an operator pulls the rope 16 and the reel 15 rotates, the ratchet member 21 swings outward and engages with the ratchet receiving portion 15b.

The recoil spiral spring 17 is a spiral spring, one end thereof is fixed to the starter case 13, and the other end thereof is fixed to the reel 15. The recoil spiral spring 17 is configured to store a rotational force when the rope 16 is pulled and the reel 15 rotates. The recoil spiral spring 17 stores the rotational force, so that when the pulled rope 16 is released, the reel 15 is reversely rotated by a spring force of the recoil spiral spring 17, and the reel 15 is configured to wind the rope 16.

Figure 8:
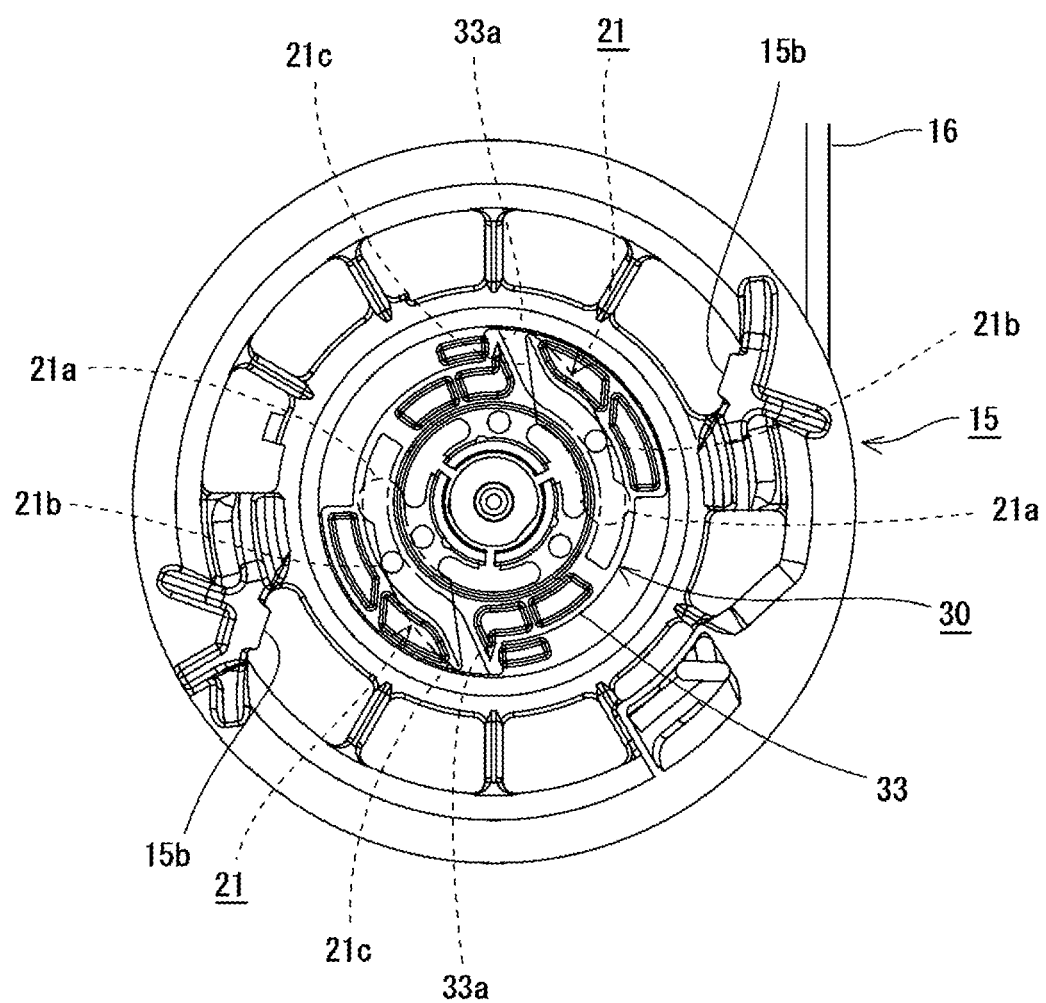
FIG. 8 is a front view (a starter case is omitted) showing a state before a rope is pulled.
Figure 9:
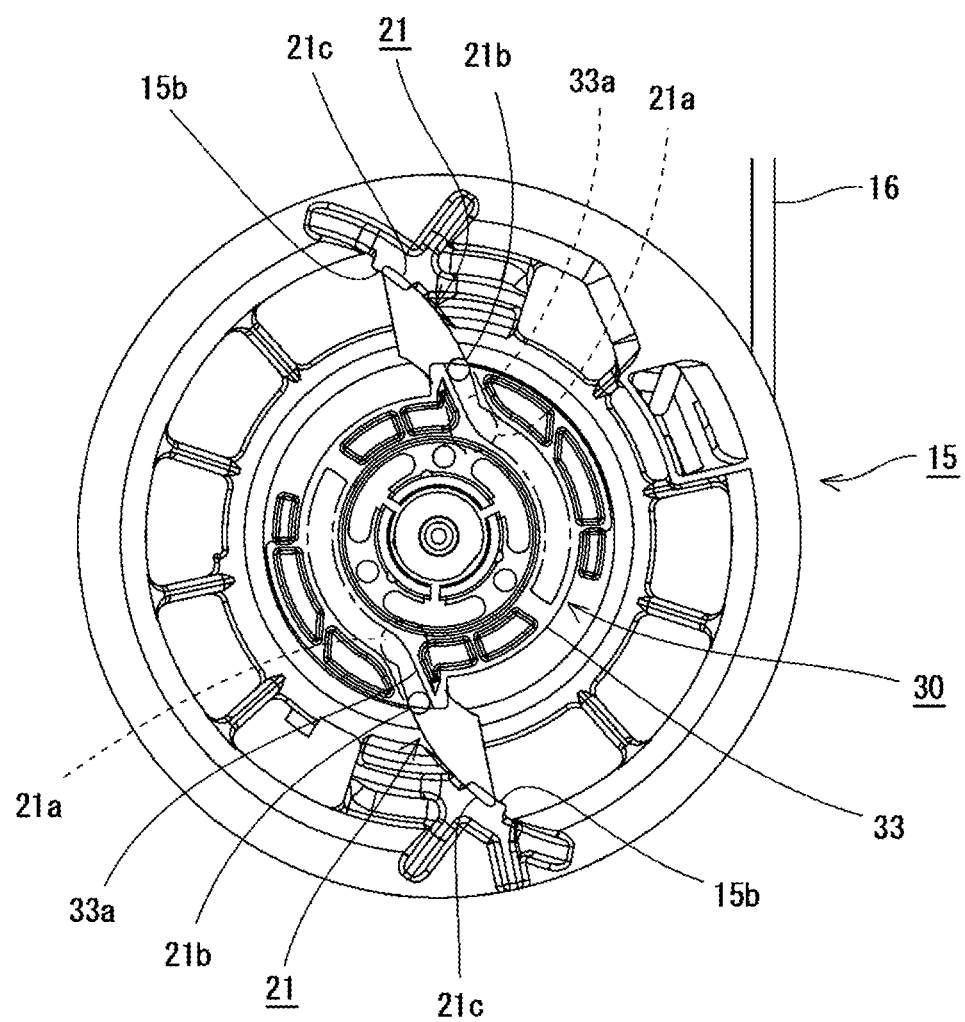
FIG. 9 is a front view (the starter case is omitted) showing a state after the rope is pulled.

As shown in FIGS. 8 and 9, the ratchet member 21 is a member swingably attached to the reel 15 by swing shaft portions 21a provided at an eccentric position of the reel 15. As shown in FIG. 8, since the ratchet member 21 is constantly urged by an urging member such as a spring (not shown) so as to be closed inward, the ratchet member 21 is in a closed state in a natural state. On the other hand, when the rope 16 is pulled, as shown in FIG. 9, the ratchet member 21 is engaged with the ratchet guide 30, which will be described later, and swings so as to open outward. Tip end engagement portions 21c are formed at tips of the ratchet members 21, and when the ratchet guide 30 swings outward, the tip end engagement portions 21c engage with the ratchet receiving portions 15b of the reel 15. In other words, the ratchet member 21 can swing outward to a position where the tip end engagement portion 21c engages with the ratchet receiving portion 15b of the reel 15. The ratchet member 21 can be stably maintained in an open state by being engaged with the ratchet receiving portion 15b. The ratchet member 21 opened in this way is engaged with a drive pulley to be described later, and becomes a state in which the rotational force of the reel 15 can be transmitted an engine side.

The ratchet member 21 includes engagement protrusions 21b between the swing shaft portions 21a and the tip end engagement portions 21c, respectively. The engagement protrusion 21b is formed to protrude in a direction of the ratchet guide 30 to be described later, and is engaged with guide grooves 33a of the ratchet guide 30. The engagement protrusion 21b is configured to guide the swing of the ratchet member 21, and the ratchet member 21 swings about the swing shaft portion 21a by the engagement protrusion 21b sliding along the guide groove 33a.

Figure 4A:
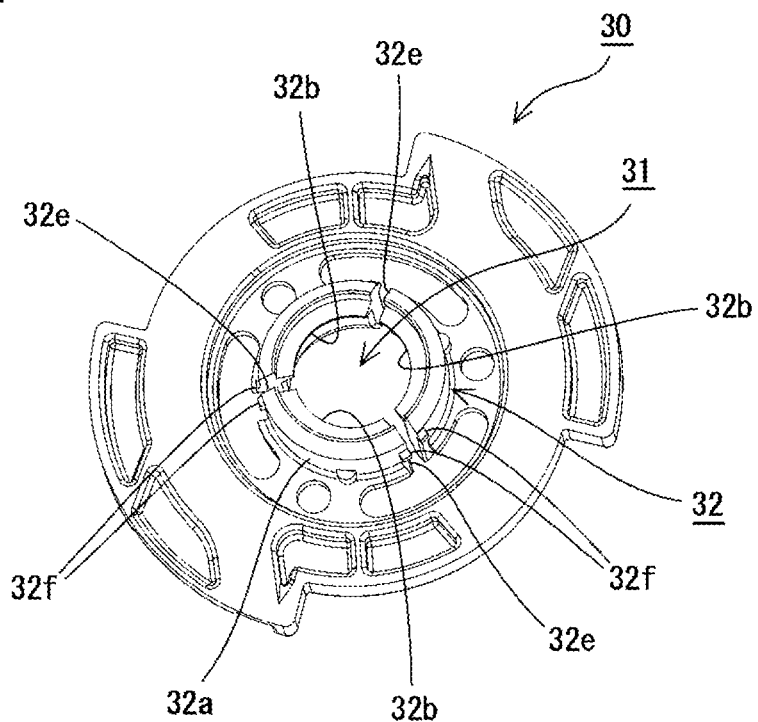
FIG. 4A is a perspective view of a ratchet guide.
Figure 4B:
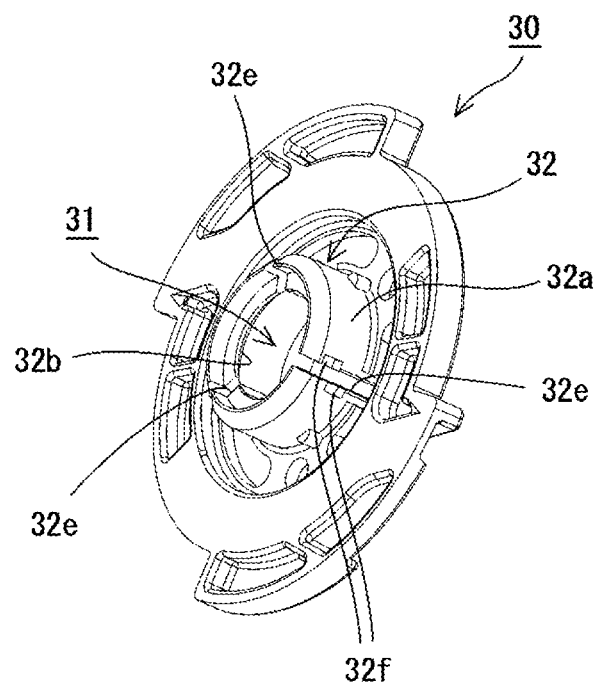
FIG. 4B is a perspective view of the ratchet guide as viewed from an angle different from that of FIG. 4A.

The ratchet guide 30 is a disc-shaped member that is rotatably attached to the reel support shaft 12 in a state in which a frictional resistance is applied thereto. The ratchet guide 30 is configured to engage with the ratchet member 21 to guide the swing of the ratchet member 21 when the reel 15 rotates in a predetermined direction (a rotation direction when the rope 16 is pulled out). The ratchet guide 30 according to the present embodiment is formed of a resin material that allows a certain degree of elastic deformation, and as shown in FIG. 4A and FIG. 4B, a through hole 31 into which the reel support shaft 12 is insertable is formed at a center of the ratchet guide 30.

The ratchet guide 30 includes the locking portion 32 that engages with the reel support shaft 12 around (on an inner periphery of) the through hole 31. The locking portion 32 is engaged with the peripheral groove 12a of the reel support shaft 12, and restricts the ratchet guide 30 from moving in an axial direction of the reel support shaft 12. Therefore, the ratchet guide 30 is attached so as not to fall off from the reel support shaft 12. Since the ratchet guide 30 is attached to the reel support shaft 12 from the outside of the reel 15, the ratchet guide 30 is attached to the reel support shaft 12, so that the ratchet guide 30 also functions as a retainer for the reel 15.

As shown in FIGS. 4A to 6, the locking portion 32 of the ratchet guide 30 includes a tubular portion 32a into which the reel support shaft 12 is insertable, and a locking claw 32b formed to protrude from an inner peripheral surface of the tubular portion 32a.

Figure 5A:
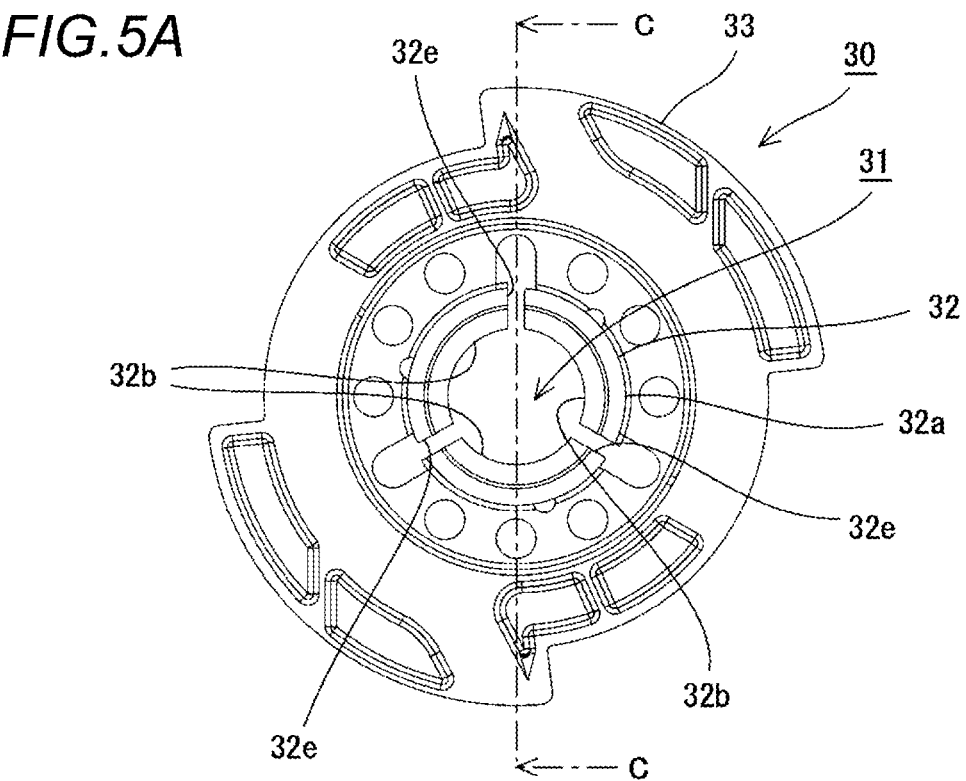
FIG. 5A is a front view of the ratchet guide.
Figure 5B:
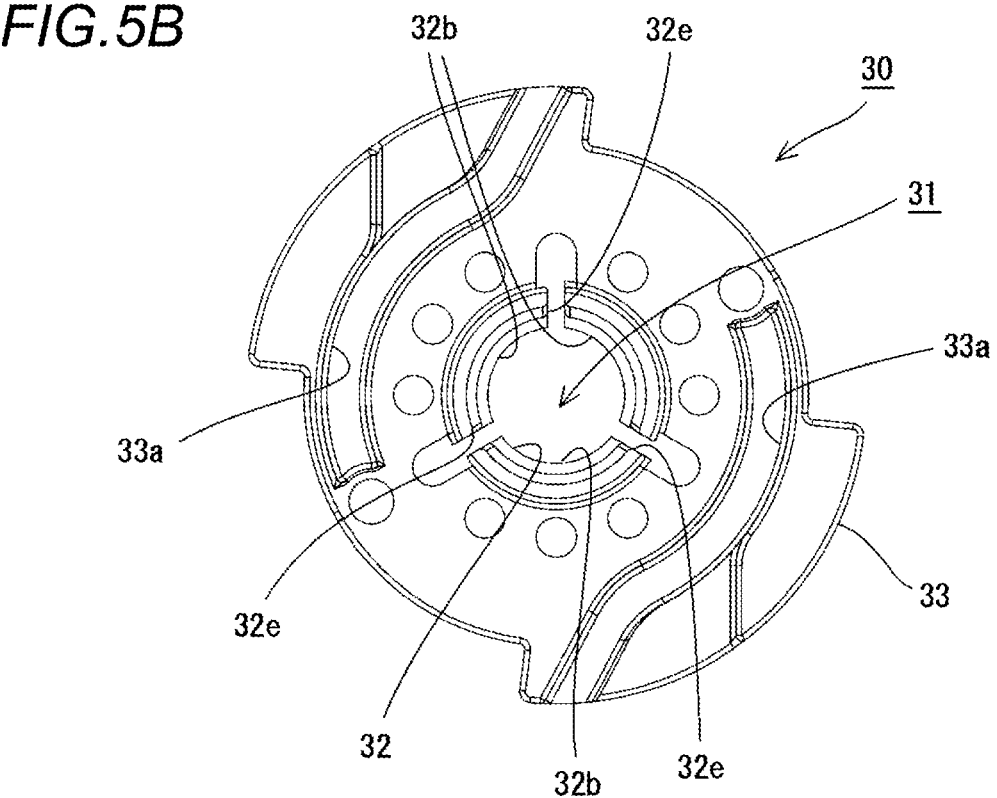
FIG. 5B is a rear view of the ratchet guide.

As shown in FIGS. 5A and 5B, the tubular portion 32a according to the present embodiment is divided by a plurality of slits 32e in a peripheral direction. In other words, the tubular portion 32a is formed by combining a plurality of arc-shaped protruding members. In the present embodiment, the tubular portion 32a is divided into three parts by three slits 32e provided at equal intervals in the peripheral direction. An inner diameter of the tubular portion 32a is formed to be slightly smaller than an outer diameter of the reel support shaft 12.

Figure 6:
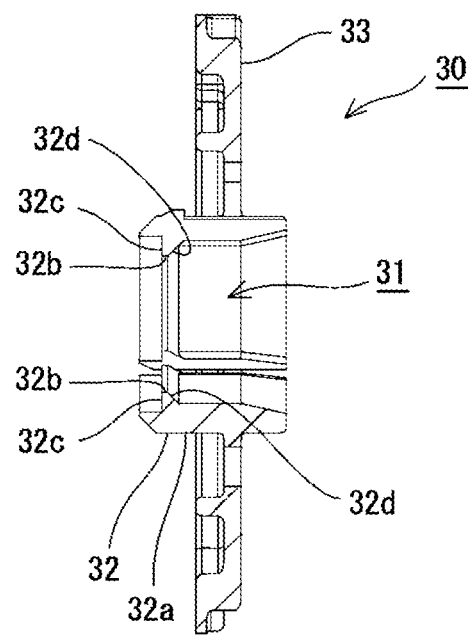
FIG. 6 is a sectional view of the ratchet guide taken along a line C-C.
Figure 7:
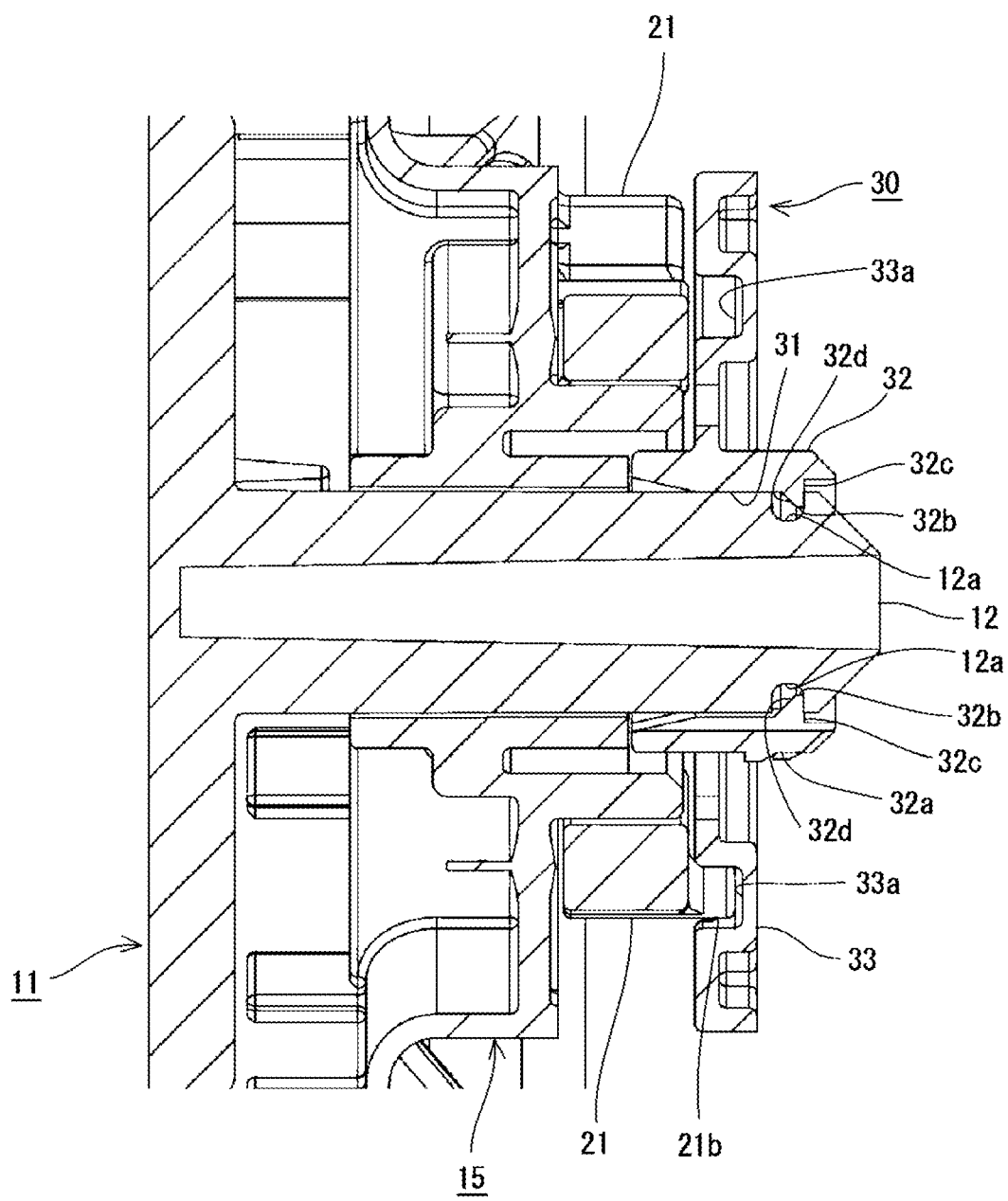
FIG. 7 is a partially enlarged sectional view of a vicinity of a reel support shaft.

The locking claw 32b formed to protrude from the inner peripheral surface of the tubular portion 32a is elastically engaged with the peripheral groove 12a of the reel support shaft 12 described above, and as shown in FIG. 7, when the reel support shaft 12 is inserted into the tubular portion 32a (through hole 31), the locking claw 32b enters and engages with the peripheral groove 12a of the reel support shaft 12. The locking claw 32b is formed so as to easily engage with the peripheral groove 12a when the locking claw 32b is attached, and so as to bite into the peripheral groove 12a and not to be detached once the locking claw 32b is attached (a check shape). Specifically, as shown in FIG. 6, as viewed in the axial direction of the reel support shaft 12, a surface of the locking claw 32 on a side opposite to the reel 15 side is a horizontal portion 32c, and a surface on the reel 15 side is an inclined portion 32d. Since the horizontal portion 32c is formed perpendicular to the axial direction of the reel support shaft 12, and the inclined portion 32d is formed obliquely with respect to the axial direction of the reel support shaft 12, a cross section of the locking claw 32b is substantially V-shaped.

With the above configuration, when the ratchet guide 30 is attached to the reel support shaft 12, the ratchet guide 30 can be easily attached only by inserting the reel support shaft 12 into the tubular portion 32a. That is, when the reel support shaft 12 is inserted into the tubular portion 32a, the tubular portion 32a is elastically deformed and expanded along the inclined portion 32d, so that the locking claw 32b can ride on the reel support shaft 12. Further, when the ratchet guide 30 is pushed to a position where the locking claw 32b is engaged with the peripheral groove 12a, the horizontal portion 32c is caught by the peripheral groove 12a, and the ratchet guide 30 is configured so as not to easily fall off from the reel support shaft 12.

In the present embodiment, for example, as shown in FIGS. 5A and 5B, the locking claw 32b is formed at each of the divided portions of the tubular portion 32a. With this configuration, when the reel support shaft 12 is inserted into the tubular portion 32a, the tubular portion 32a is easily expanded, and an operation of attaching the ratchet guide 30 is facilitated. On the other hand, after the ratchet guide 30 is attached to the reel support shaft 12, the divided locking claws 32b are individually engaged with the peripheral groove 12a, so that the ratchet guide 30 is less likely to fall off.

As described above, the inner diameter of the tubular portion 32a according to the present embodiment is formed to be slightly smaller than the outer diameter of the reel support shaft 12. Therefore, when the locking claw 32b is engaged with the peripheral groove 12a, the tubular portion 32a is in a state of being elastically deformed in a slightly expanding direction. Therefore, the inner peripheral surface of the tubular portion 32a is pressed against the reel support shaft 12 by an elastic force that causes the tubular portion 32a to return in a diameter decreasing direction, and friction is generated between the locking portion 32 and the reel support shaft 12. In this way, the ratchet guide 30 is attached to the reel support shaft 12 in a state in which a predetermined frictional resistance is applied, and in order for the ratchet guide 30 to rotate about the reel support shaft 12, a force that is larger than the frictional resistance generated between the locking portion 32 and the reel support shaft 12 needs to be applied.

The ratchet guide 30 includes a flange portion 33 around the locking portion 32 described above. As shown in FIGS. 2 and 3, the flange portion 33 protrudes so as to cover the ratchet member 21 attached to the reel 15, that is, the ratchet member 21 is sandwiched and held between the flange portion 33 and the reel 15. As shown in FIG. 5B, guide grooves 33a are formed in a surface of the flange portion 33 facing the ratchet member 21. The guide groove 33a is configured to guide the swing of the ratchet member 21, and is engaged with the engagement protrusion 21b of the ratchet member 21. When the reel 15 and the ratchet guide 30 rotate relatively to each other, the engagement protrusion 21b slides along the guide groove 33a, whereby the ratchet member 21 swings.

When the engine is started by using the recoil starter 10, the rope 16 drawn out of the starter case 11 is vigorously pulled. As a result, the reel 15 rotates.

FIG. 8 shows a state before the reel 15 starts rotating. When the reel 15 rotates from this state, as shown in FIG. 9, the ratchet guide 30 does not rotate because the ratchet guide 30 is attached to the reel support shaft 12 with the predetermined frictional resistance. In other words, since only the reel 15 rotates without the ratchet guide 30 rotating, the reel 15 and the ratchet guide 30 rotate relatively to each other. Therefore, the engagement protrusion 21b slides along the guide groove 33a, and therefore the ratchet member 21 swings in an opening direction around the swing shaft portion 21a. When the ratchet member 21 swings, the tip end engagement portion 21c of the ratchet member 21 engages with the ratchet receiving portion 15b.

Although not particularly shown, when the ratchet member 21 is engaged with the ratchet receiving portion 15b, the ratchet member 21 is engaged with the drive pulley, and the rotational force of the reel 15 is transmitted to the drive pulley. The drive pulley has a known configuration of the related art, and is a tubular member connected to the crankshaft of the engine. The drive pulley is rotatably supported coaxially with the reel support shaft 12, and is attached so as to cover the ratchet guide 30. When the rotational force of the reel 15 is transmitted to the drive pulley, the crankshaft of the engine is forcibly rotated in conjunction with the rotation of the drive pulley, and a starting rotational force is applied to the engine.

In a case where it is desired to increase the frictional resistance acting between the ratchet guide 30 and the reel support shaft 12, a retaining ring 35 may be attached on an outer periphery of the locking portion 32 (tubular portion 32a). That is, the locking portion 32 according to the present embodiment is formed such that the retaining ring 35 is attachable on the outer periphery thereof, and has a falling-off prevention shape 32f for preventing the retaining ring 35 from falling off.

Figure 10:
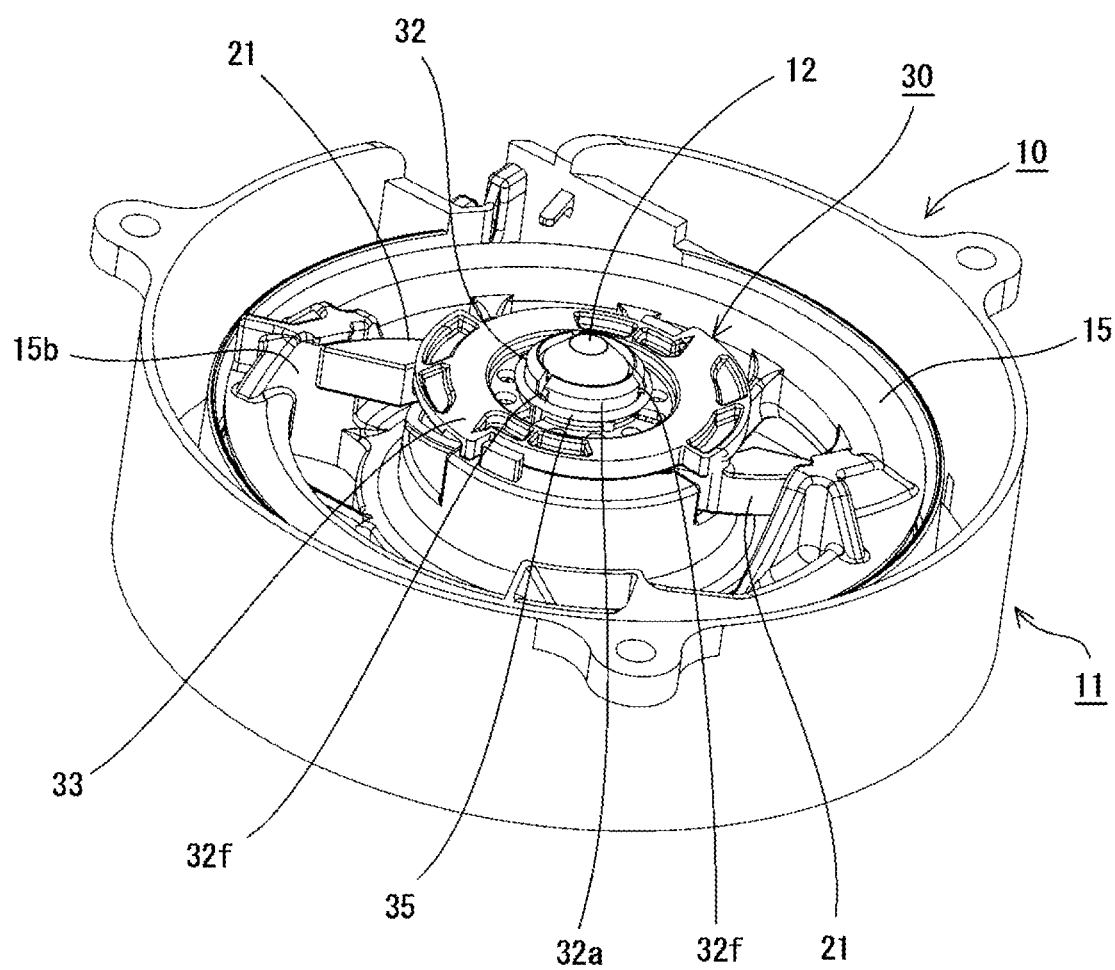
FIG. 10 is an external perspective view of the recoil starter to which a retaining ring is attached.

The retaining ring 35 attached on the locking portion 32 is, for example, a ring-shaped member as shown in FIG. 10, and is attached on the outer periphery of the tubular portion 32a so as to hold the tubular portion 32a. In addition, the falling-off prevention shape 35 is a protrusion formed to protrude from the outer periphery of the tubular portion 32a to prevent the retaining ring 35 from falling off, and is formed so as to be able to hold the retaining ring 35 such that the retaining ring 35 cannot move in the axial direction of the tubular portion 32a. When such a retaining ring 35 is used, the frictional resistance acting between the locking portion 32 and the reel support shaft 12 can be increased by increasing a force pressing the tubular portion 32a inward.

As described above, according to the present embodiment, the ratchet guide 30 includes the locking portion 32 that engages with the reel support shaft 12 around the through hole 31 into which the reel support shaft 12 is insertable, and is configured such that a movement of the ratchet guide 30 in the axial direction of the reel support shaft 12 is restricted by the locking portion 32 engaging with the reel support shaft 12. According to such a configuration, since an industrial fastener for rotatably attaching the ratchet guide 30 is unnecessary, it is possible to reduce the number of components and the number of assembly steps as compared with the related art.

Moreover, at this time, the friction resistance is applied to the ratchet guide 30 due to friction generated between the locking portion 32 and the reel support shaft 12. Therefore, since a spring for applying a frictional resistance to the ratchet guide 30 is not necessary, it is possible to reduce the number of components and the number of assembly steps as compared with the related art.

The peripheral groove 12a for engaging with the locking portion 32 is formed on the surface of the reel support shaft 12, the locking portion 32 includes the tubular portion 32a into which the reel support shaft 12 is insertable, and the locking claw 32b that elastically engages with the peripheral groove 12a is provided on the inner peripheral surface of the tubular portion 32a. According to such a configuration, since the ratchet guide 30 is attached only by inserting the reel support shaft 12 into the tubular portion 32a, an assembling property is good.

The tubular portion 32a is divided by the plurality of slits 32e in the peripheral direction, and the locking claws 32b are formed in the divided portions. According to such a configuration, by dividing a contact surface of the tubular portion 32a that comes into contact with the outer peripheral surface of the reel support shaft 12, the respective divided portions are independently engaged with the outer peripheral surface of the reel support shaft 12, and therefore adhesion to the reel support shaft 12 is improved as compared with a case where the tubular portion is not divided. By improving the adhesion to the reel support shaft 12, the frictional resistance acting on the ratchet guide 30 can be increased, and the ratchet guide 30 can be prevented from falling off.

The present application is based on a Japanese Patent Application No. 2019-170250 filed on Sep. 19, 2019, and the contents thereof are incorporated herein by reference.

The invention claimed is:

1. A recoil starter comprising:
a starter case provided with a reel support shaft;
a reel rotatably attached to the reel support shaft;
a ratchet member swingably attached to the reel; and
a ratchet guide rotatably attached to the reel support shaft in a state in which a frictional resistance is applied, and configured to engage with the ratchet member to guide a swing of the ratchet member when the reel rotates in a predetermined direction,
wherein the reel support shaft includes a groove that engages with a locking portion on a surface of the reel support shaft,
wherein the ratchet guide includes:
a through hole into which the reel support shaft is insertable; and
the locking portion configured to be engaged with the reel support shaft on an inner periphery of the through hole, and
wherein a movement of the ratchet guide in an axial direction of the reel support shaft is restricted in a state in which the locking portion provided on the ratchet guide is engaged with the reel support shaft.

2. The recoil starter according to claim 1, wherein a friction generated between the locking portion and the reel support shaft applies the frictional resistance to the ratchet guide.

3. The recoil starter according to claim 1, wherein the groove includes a peripheral groove provided on the surface of the reel support shaft,
wherein the locking portion includes a tubular portion into which the reel support shaft is insertable, and
wherein a locking claw configured to elastically engage with the peripheral groove is provided on an inner peripheral surface of the tubular portion.

4. The recoil starter according to claim 3, wherein the tubular portion is divided by a plurality of slits in a peripheral direction of the tubular portion, and
each of divided portions of the tubular portion includes the locking claw.

5. The recoil starter according to claim 4, wherein the locking portion is formed such that a retaining ring is attachable on an outer periphery thereof, and
the portion has a fall-off prevention shape configured to prevent the retaining ring from falling off.

6. The recoil starter according to claim 1, wherein an inner diameter of a tubular portion of the ratchet guide is smaller than an outer diameter of the reel support shaft.

7. The recoil starter according to claim 1, wherein a locking claw, configured to elastically engage with a peripheral groove, is divided by a plurality of slits in a peripheral direction of the locking claw.

8. The recoil starter according to claim 7, wherein, in the state in which the locking portion is engaged with the reel support shaft, divided locking claws of the locking claw are individually engaged with the peripheral groove.

9. The recoil starter according to claim 3, wherein the tubular portion is divided by a plurality of first slits in a peripheral direction of the tubular portion,
wherein the locking claw is divided by a plurality of second slits in the peripheral direction of the tubular portion, and
wherein, in the peripheral direction of the tubular portion, the first slits overlap with the second slits.

10. The recoil starter according to claim 1, wherein the ratchet guide includes a flange portion provided in a circumference of the locking portion to cover the ratchet member, and
wherein the ratchet member is sandwiched and held between the flange portion and the reel.

* * * * *